United States Patent [19]

Lapp

[11] 4,342,332

[45] Aug. 3, 1982

[54] THREE-POSITION, FOUR-WAY ROTARY VALVE

[76] Inventor: Ellsworth W. Lapp, c/o Lapp Engineering, Inc., 4701 Hydraulic Rd., Rockford, Ill. 61109

[21] Appl. No.: 179,954

[22] Filed: Aug. 21, 1980

[51] Int. Cl.³ ............................................. F16K 11/02
[52] U.S. Cl. ............................ 137/625.23; 137/625.24
[58] Field of Search ..................... 137/625.21, 625.22, 137/625.23, 625.24; 251/232; 74/516, 518

[56] References Cited

U.S. PATENT DOCUMENTS

| | | | |
|---|---|---|---|
| 2,360,987 | 10/1944 | Temple | 137/625.21 |
| 2,696,219 | 12/1954 | Barksdale | 137/625.21 X |
| 2,907,349 | 10/1959 | White | 137/625.23 |
| 3,628,570 | 12/1971 | Andis | 137/625.23 |
| 3,892,259 | 7/1975 | McClocklin | 137/625.21 |

FOREIGN PATENT DOCUMENTS 874232 4/1953 Fed. Rep. of Germany ...... 251/232

Primary Examiner—Alan Cohan
Attorney, Agent, or Firm—Leydig, Voit, Osann, Mayer & Holt, Ltd.

[57] ABSTRACT

Openings and passages are formed in the valve disc to enable the disc to rotate to active positions on either side of a neutral position upon being moved through a relatively small angle of 30 degrees. The valve disc is adapted to be rotated by a pivoted actuator whose motion is amplified to enable the actuator to rotate the valve disc through its 30 degree angle when the actuator is pivoted through an angle of 15 degrees.

8 Claims, 16 Drawing Figures

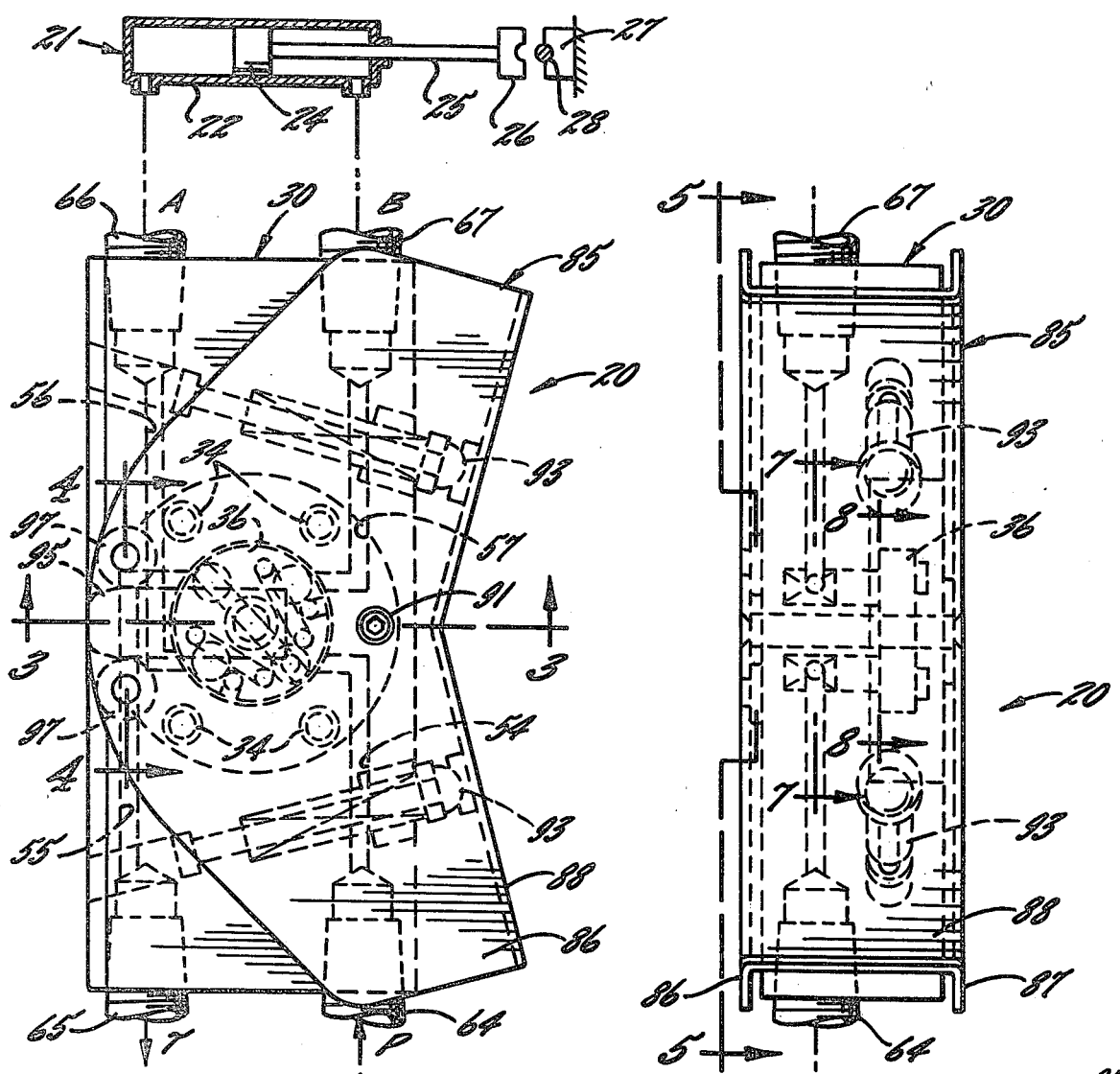
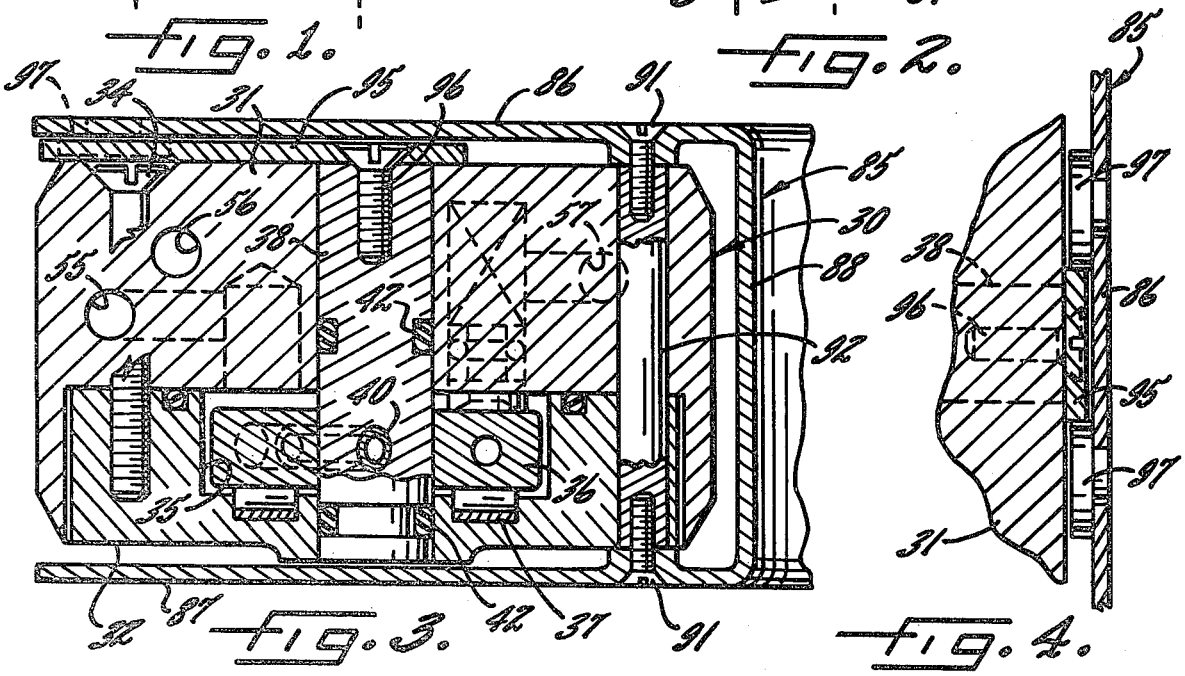

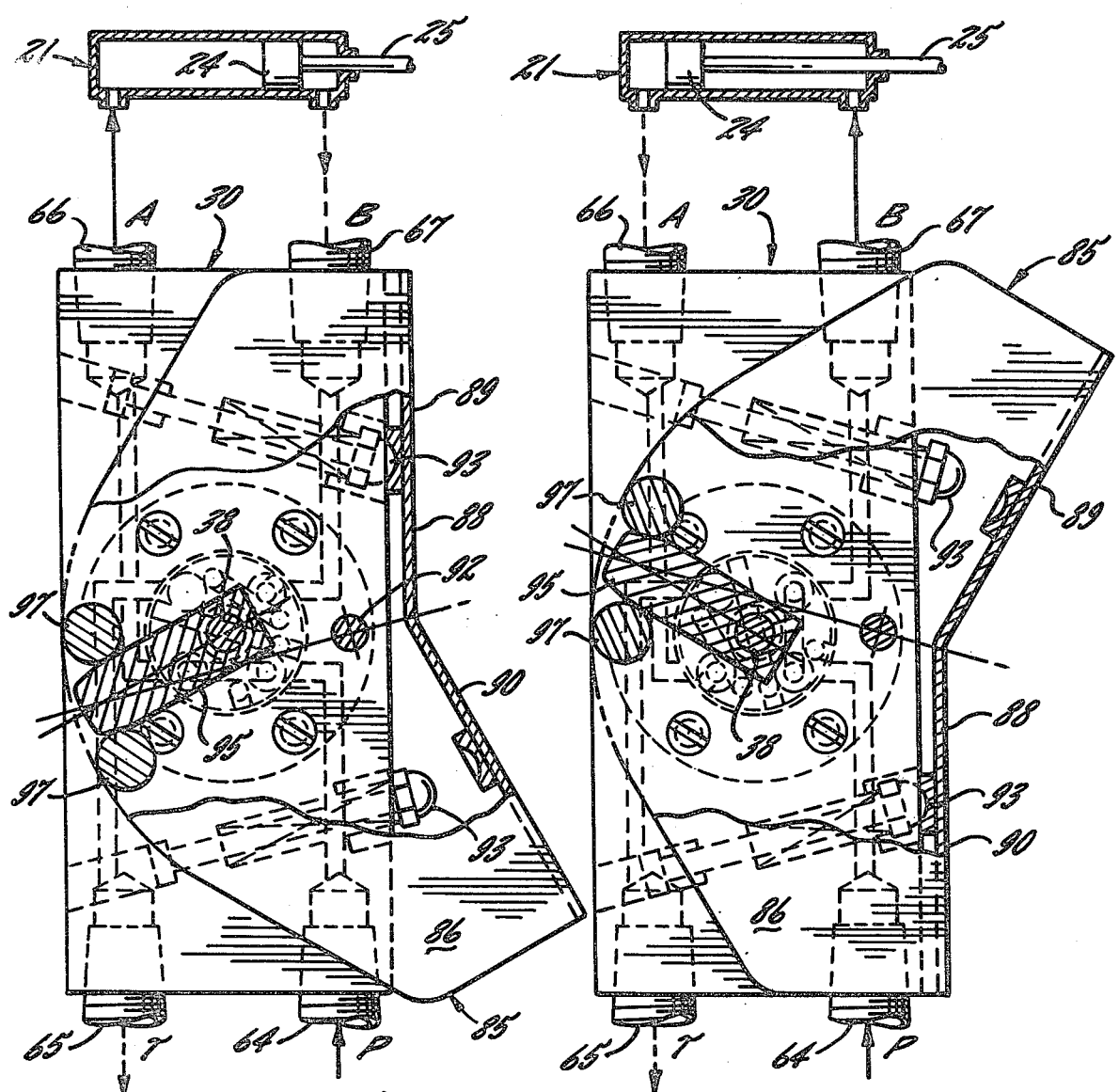
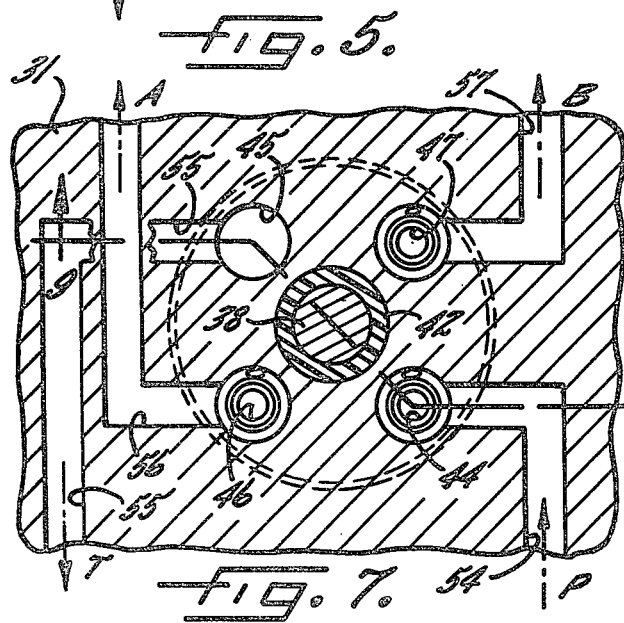

THREE-POSITION, FOUR-WAY ROTARY VALVE

BACKGROUND OF THE INVENTION

This invention relates to a three-position, four-way rotary valve of the type in which a valve member is rotatably mounted in a valve housing. When the valve member is rotated in one direction from a neutral position to a first active position, passages in the valve enable pressurized fluid to flow to the first side of a utilization device (e.g., a hydraulic cylinder) while additional passages enable pressure fluid to dump to drain from the other side of the utilization device. If the valve member is rotated in the opposite direction from its neutral position to a second active position, the second side of the utilization device is pressurized and, at the same time, the first side of the utilization device is connected to drain.

More specifically, the invention relates to a valve in which the valve member is rotated between its positions by manually turning an actuator which is associated with the valve. Such a valve may, for example, be used in connection with a hand-manipulated tool whose operating elements are actuated by a hydraulic cylinder which is controlled by the valve.

SUMMARY OF THE INVENTION

The general aim of the present invention is to provide a new and improved three-position, four-way rotary valve whose valve member may be rotated between its various positions by turning the valve actuator through only a very small angle so as to facilitate simple and easy actuation of the valve.

A more detailed object is to achieve the foregoing by providing a valve whose passages are uniquely arranged and located so as to enable the valve member to move between its various positions while rotating through a comparatively small angle.

A further object of the invention is to provide novel mechanism for amplifying the motion of the valve actuator, the amplifying mechanism serving to rotate the valve member through its required angle when the actuator is turned through a significantly smaller angle.

These and other objects and advantage of the invention will become more apparent from the following detailed description when taken in conjunction with the accompanying drawings.

BRIEF DESCRIPTION OF THE DRAWINGS

FIG. 1 is a top plan view of a new and improved valve incorporating the unique features of the present invention, the valve being shown in conjunction with a typical utilization device and the valve member being shown in its neutral position.

FIG. 2 is a side elevational view of the valve shown in FIG. 1.

FIGS. 3 and 4 are enlarged fragmentary cross-sections taken substantially along the lines 3—3 and 4—4, respectively, of FIG. 1.

FIG. 5 is a fragmentary cross-section taken substantially along the line 5—5 of FIG. 2 and shows the valve member in one of its active positions.

FIG. 6 is a view similar to FIG. 5 but shows the valve member in its other active position.

FIG. 7 is an enlarged fragmentary cross-section taken substantially along the line 7—7 of FIG. 2.

FIG. 8 is an enlarged fragmentary cross-section taken substantially along the line 8—8 of FIG. 2 and shows the valve member in its neutral position.

DETAILED DESCRIPTION OF THE PREFERRED EMBODIMENT

Figure 9:
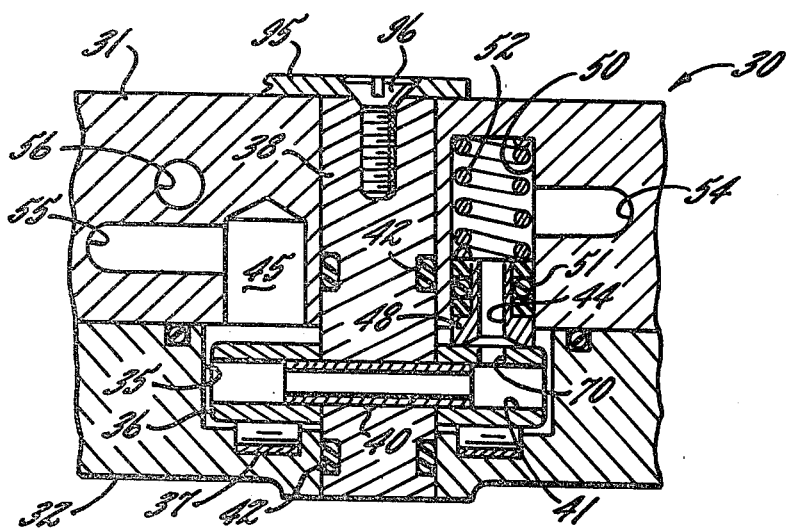
FIG. 9 is a fragmentary cross-section taken substantially along the line 9—9 of FIG. 7.

As shown in the drawings for purposes of illustration, the invention is embodied in a three-position, four-way rotary valve 20 for controlling the flow of pressure fluid to and from a hydraulic utilization device 21. The latter may, for example, comprise a cylinder 22 which slidably receives a piston 24 having a rod 25 projecting therefrom and carrying a crimping die 26. When pressure fluid is admitted into the head end of the cylinder and is dumped from the rod end of the cylinder, the die is advanced and coacts with a fixed die 27 to crimp a workpiece 28 located between the dies. The die 26 is retracted away from the die 27 when pressure fluid is admitted into the rod end of the cylinder and is dumped from the head end of the cylinder.

The valve 20 comprises a housing 30 formed by an upper body 31 and by a lower cap 32 which are secured together by screws 34 (FIG. 3), there being a chamber 35 defined within the housing between the body and the cap. A valve member or disc 36 is located within the chamber with substantial radial and axial clearance and is rotatably supported on an annular needle bearing 37 which is secured to the cap. Extending through the center of the valve disc 36 is an upright shaft 38 which is secured rigidly to the disc by a tubular roll pin 40 disposed within an opening or passage 41 (FIG. 9) extending through the valve disc. The shaft is rotatably supported by the body 31 and the cap 32 and is sealed thereto by O-rings 42 (FIG. 3). The axis of the shaft defines the rotational axis of the valve disc.

Four ports (i.e., a pressure port 44, a drain port 45 and first and second outlet ports 46 and 47) are formed in the valve body 31 and open downwardly into the chamber 35 (see FIG. 7). The drain port 45 is simply defined by a hole in the valve body 31. Each of the other three ports, however, is defined by a tubular valve grommet 48 (FIG. 9) which seats against the upper face of the valve disc 36 with a pressure-tight seal. Each grommet is located within a hole 50 in the valve body 31, is sealed to the body by an O-ring 51 and is urged downwardly into engagement with the valve disc 36 by a coiled compression spring 52.

As shown in FIG. 7, the four ports 44 to 47 are spaced equally from one another around a circle with the pressure port 44 being located diametrically opposite of the drain port 45 and with the outlet port 46 being located diametrically opposite of the outlet port 47. Passages 54 to 57 (FIGS. 1 and 7) are formed in the valve body 31 and establish communication between the ports 44 to 47 and lines 64 to 67, respectively. The line 64 leads to the valve 20 from a pump (not shown), the line 65 leads to a return tank (not shown), the line 66 leads to the head end of the cylinder 22 and the line 67 leads to the rod end of the cylinder.

Figure 14:
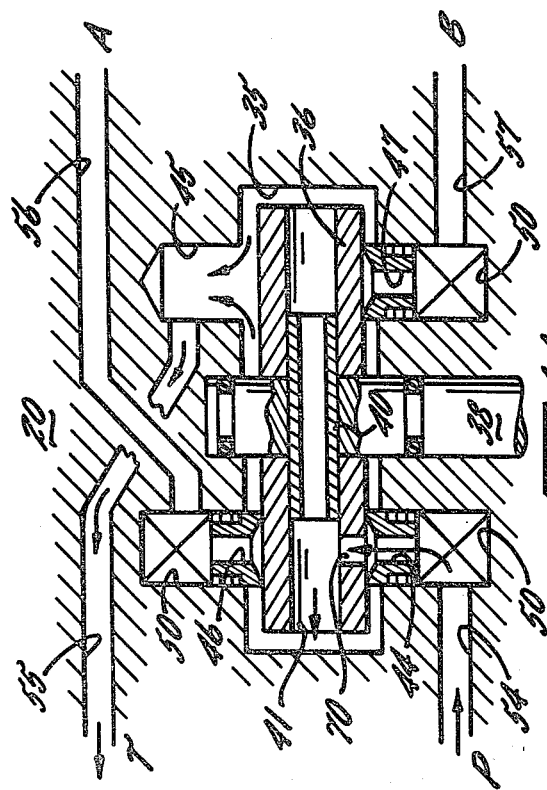

Normally, the valve disc 36 is located in a neutral position (see FIGS. 1, 8 and 14). In this instance, the valve 20 is of the open center type and thus, when the valve disc is in its neutral position, communication is established directly between the pressure port 44 and the drain port 45 (see FIG. 9). For this purpose, an opening 70 is formed in the upper side of the valve disc and communicates with the passage 41 which extends through the disc. When the valve disc is in its neutral position, the opening 70 is alined with the pressure port 44 (as shown in FIGS. 8, 9 and 14). Accordingly, pressure fluid from the pump flows through the line 64, the passage 54 and the port 44, flows into the opening 70, through the passage 41 and into the chamber 35 and then flows out of the drain port 45 and through the passage 55 and the line 65 to the tank. When the valve disc is in its neutral position, its upper surface blocks the outlet ports 46 and 47 and thus pressure fluid is prevented from flowing either to or from the cylinder 22.

Figure 12:
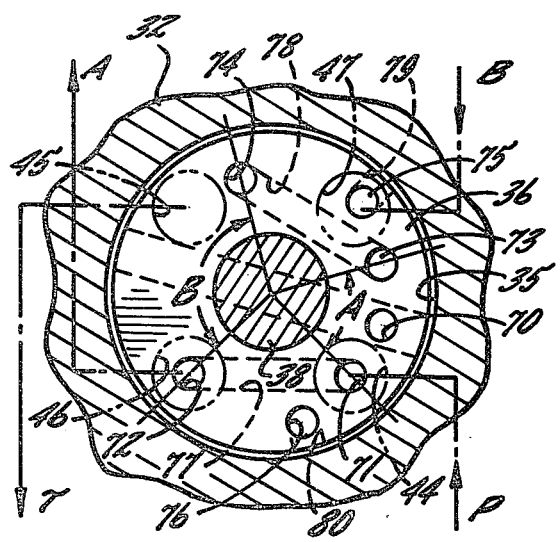
FIG. 12 is a view similar to FIG. 8 but shows the valve member in one of its active positions.

When the valve disc 36 is rotated counterclockwise from its neutral position to a first active position (FIGS. 5, 12 and 15) communication is established between the pressure port 44 and the outlet port 46 so that pressure fluid from the pump may flow to the head end of the cylinder 22 to advance the rod 25. At the same time, communication is established between the outlet port 47 and the drain port 45 to enable the pressure fluid in the rod end of the cylinder to return to the tank. Conversely, clockwise rotation of the valve disc 36 from its neutral position to a second active position (FIGS. 6, 13 and 16) establishes communication between the pressure port 44 and the outlet port 47 and also establishes communication between the outlet port 46 and the drain port 45. Thus, pressure fluid is allowed to flow to the rod end of the cylinder 22 and to flow from the head end of the cylinder to effect retraction of the rod 25.

In accordance with one aspect of the present invention, the valve disc 36 is uniquely constructed to enable the disc to rotate through a comparatively small angle when the disc is turned from its neutral position to either of its active positions. As will become more apparent subsequently, the ability of the disc to move to its active positions while turning through only a relatively small angle facilitates actuation of the valve 20.

Figure 10:
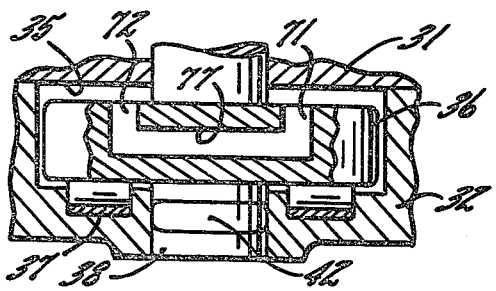
FIGS. 10 and 11 are fragmentary cross-sections taken substantially along the lines 10—10 and 11—11, respectively, of FIG. 8.
Figure 11:
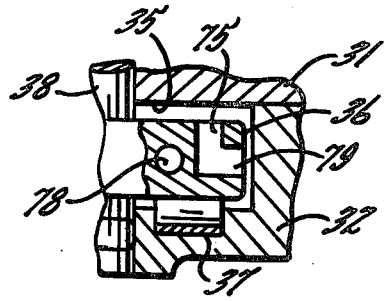
Figure 15:
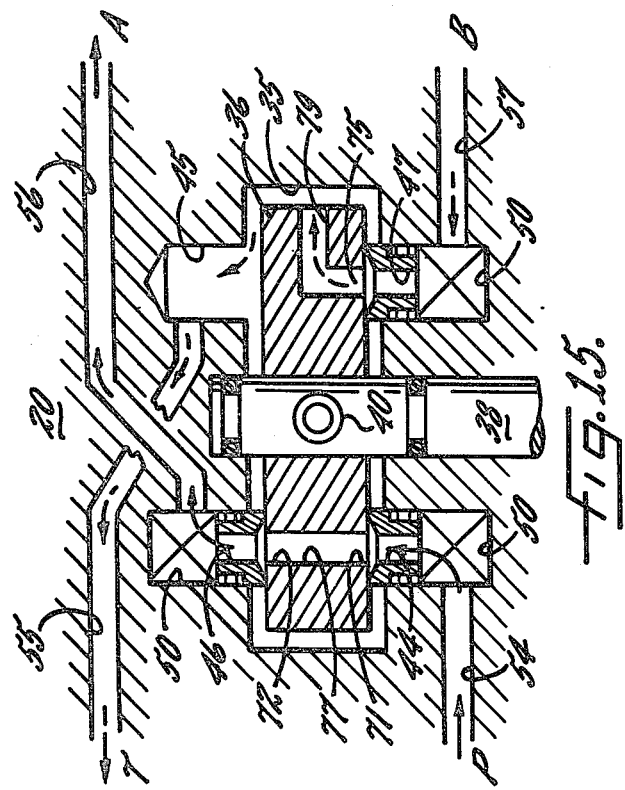
FIGS. 14, 15 and 16 are schematic views which show the valve member in its various positions.
Figure 16:
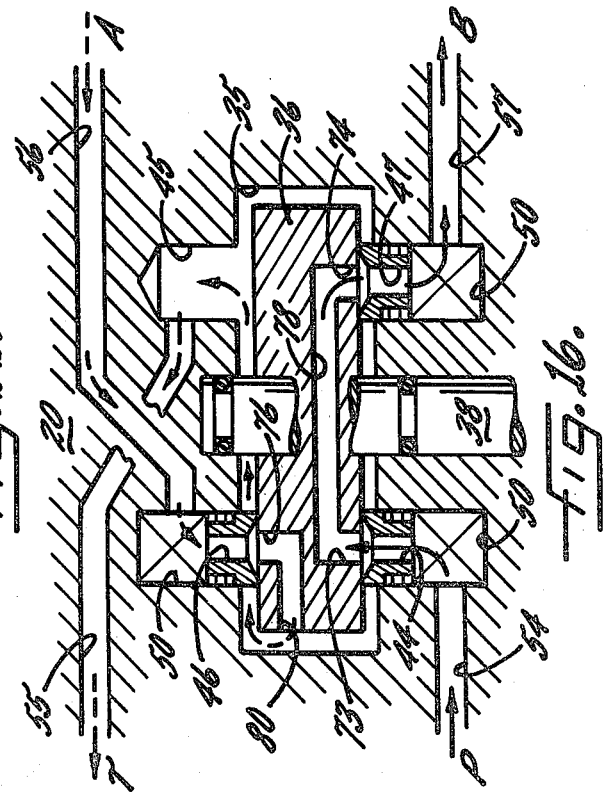

More specifically, the foregoing is achieved by forming the upper face of the valve disc 36 with six openings 71 to 76 (FIG. 8) in addition to the opening 70. The openings 71 and 72 communicate with one another by way of a U-shaped passage 77 which is formed in the disc (see FIG. 10). A similarly shaped passage 78 (FIGS. 8 and 16) in the valve disc establishes communication between the openings 73 and 74. Also formed in the disc and opening out of the periphery thereof are two L-shaped passages 79 and 80 (FIGS. 11, 15 and 16). The passage 79 allows the opening 75 to communicate with the chamber 35 while the passage 80 establishes communication between the opening 76 and the chamber.

Figure 13:
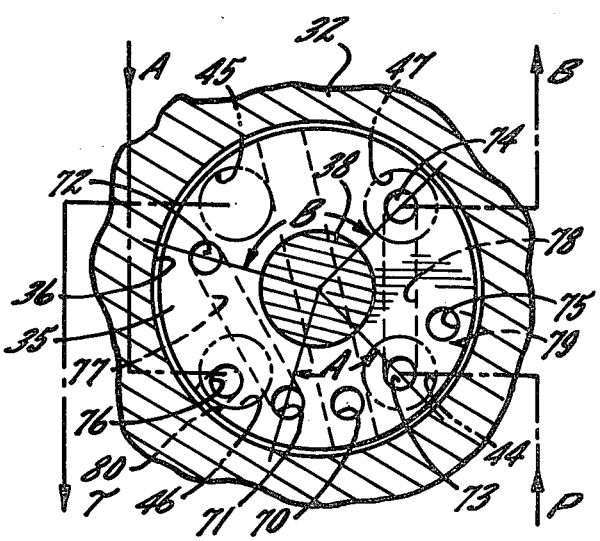
FIG. 13 is a view similar to FIG. 12 but shows the valve member in its other active position.

The four openings 71 to 74 are located around a circle having the same diameter as the circle around which the ports 44 to 47 are spaced (see FIG. 13). In carrying out the invention, the openings 71 to 74 are spaced unequally from one another so as to enable the openings to properly aline with the ports when the valve disc 36 is turned in either direction from its neutral position and through a predetermined angle of less than 45 degrees.

In this particular instance, the valve disc 36 is capable of moving from its neutral position to either of its active positions when the disc is turned through an angle of 30 degrees. To achieve this, the openings 71 and 73 are spaced from one another by an angle A (see FIG. 13) of 60 degrees while the openings 72 and 74 are spaced from one another by an angle B of 120 degrees. The openings 71 and 73 are spaced 90 degrees from the openings 72 and 74, respectively. In addition, the openings 75 and 76 are spaced 120 degrees from one another and are spaced 30 degrees from the openings 73 and 71, respectively. The openings 75 and 76 lie on a common circle whose diameter is somewhat larger than that of the circle around which the openings 71 to 74 are spaced.

With the foregoing arrangement, the openings 71 and 73 are located clockwise and counterclockwise, respectively, of the pressure port 44 and are spaced 30 degrees therefrom when the valve disc 36 is in its neutral position (see FIG. 8). In addition, the opening 72 is spaced 30 degrees in a clockwise direction from the outlet port 46 while the opening 74 is spaced 30 degrees in a counterclockwise direction from the outlet port 47. Finally, the opening 75 is spaced 30 degrees in a clockwise direction from the outlet port 47 while the opening 76 is spaced 30 degrees in a counterclockwise direction from the outlet port 46 when the valve disc is in its neutral position. As a result, the only flow which can occur through the valve 20 when the disc is in its neutral position is that which takes place from the pressure port 44 to the drain port 45 via the opening 70, the passage 41 and the chamber 35. This flow condition is shown in FIG. 14 which is not an actual physical representation of the valve 20 but instead is a schematic representation in order to more clearly illustrate the open or closed conditions of the various ports, openings and passages. FIGS. 15 and 16 are similar schematic representations but show the disc 36 in its first and second active positions, respectively.

When the disc 36 is rotated through 30 degrees in a counterclockwise direction from its neutral position (FIGS. 8 and 14) to its first active position (FIGS. 12 and 15), the openings 71 and 72 move into alinement with the pressure port 44 and the outlet port 46, respectively. At the same time, the opening 75 moves into alinement with the outlet port 47. As a result, pressure fluid from the pump flows to the head end of the cylinder 22 by way of the pressure port 44, the opening 71, the passage 77, the opening 72 and the outlet port 46. In addition, pressure fluid from the rod end of the cylinder returns to the tank via the outlet port 47, the opening 75, the passage 79, the chamber 35 and the drain port 45.

Reverse flows occur when the valve disc 36 is rotated 30 degrees in a clockwise direction from its neutral position (FIGS. 8 and 14) to its second active position (FIGS. 13 and 16). Such rotation moves the openings 73 and 74 into alinement with the pressure port 44 and the outlet port 47, respectively, and moves the opening 76 into alinement with the outlet port 46. Accordingly, pressure fluid from the pump flows to the rod end of the cylinder 22 via the pressure port 44, the opening 73, the passage 78, the opening 74 and the outlet port 47. Pressure fluid from the head end of the cylinder is dumped to the tank by way of the outlet port 46, the opening 76, the passage 80, the chamber 35 and the drain port 45.

From the foregoing, it will be apparent that the valve disc 36 may be rotated from its neutral position to either of its active positions by turning the disc through a relatively small angle (e.g., 30 degrees). In accordance with another important feature of the invention, the valve disc is adapted to be turned by a pivoted actuator 85 whose motion is uniquely amplified so that the disc may be turned through its required angle when the actuator is pivoted through a substantially smaller angle. As a result, the actuator may be manipulated and pivoted in a simple and easy manner and without need of the operator of the valve 20 moving the actuator through a substantial distance.

Herein, the actuator 85 is in the form of a trigger element and includes upper and lower plates 86 and 87 (FIG. 3) formed integrally with an upright web 88. The plates 86 and 87 are located above and below the valve housing 30 while the web 88 is located in front of the housing. The web is substantially V-shaped and includes surfaces 89 and 90 (FIGS. 5 and 6) which may be squeezed manually by the operator's fingers and palm to turn the valve disc 36 counterclockwise and clockwise, respectively.

As shown in FIG. 3, the plates 86 and 87 are fastened by screws 91 to an upright pin 92 which is rotatably mounted in the valve housing 30. The pin extends parallel to but is offset radially from the shaft 38 and defines the pivot axis of the trigger 85. Two spring-loaded plungers 93 are compressed between the housing 30 and the web 88 of the trigger and bias the trigger to a centered or neutral position shown in FIG. 1. When the trigger is pivoted counterclockwise from its neutral position (see FIG. 5), the valve disc 36 is rotated counterclockwise to its first active position. Conversely, clockwise pivoting of the trigger from its neutral position results in clockwise rotation of the valve disc to its second active position (see FIG. 6).

In keeping with the invention, mechanism is provided for transmitting the pivoting motion of the trigger 85 to the valve disc 36 and for amplifying such motion so as to enable the disc to be rotated through its 30 degree angle when the trigger is pivoted through a smaller angle of, for example, 15 degrees. Herein, this mechanism is a lever 95 (FIGS. 3, 5 and 6) having an inner end portion which is secured rigidly to the top of the shaft 38 by a screw 96. The outer end portion of the lever 95 extends slidably between a pair of angularly spaced buttons 97 (FIGS. 4 and 5) secured to and depending from the upper plate 86 of the trigger 85. The lever 95 extends from the shaft 38 in a direction opposite from the pin 92 and, as shown in FIGS. 3 and 5, the moment arm between the shaft 38 and the buttons 97 is one-half the length of the moment arm between the pin 92 and the buttons. As a result, motion of the trigger 85 is transmitted to the lever 95 with a 1 to 2 amplification ratio.

With the foregoing arrangement, rotation of the trigger 85 through 15 degrees in either direction from its neutral position results in one of the buttons 97 engaging and turning the lever 95. By virtue of the amplification effected by the difference in the lengths of the moment arms, the lever 95 is turned through 30 degrees and, at the same time, slides inwardly relative to the buttons 97 to allow both the trigger and the lever to turn about their respective axes 92 and 38. The valve disc 36 is turned by the lever and is moved through 30 degrees for 15 degrees movement of the trigger. Thus, the trigger need be moved through only a relatively small angle to actuate the valve 20.

I claim:

1. A three-position, four-way rotary valve comprising a housing defining a chamber, a pressure port, a drain port and first and second outlet ports all formed in said housing and opening into said chamber, said pressure port and said outlet ports being spaced around a circle with said outlet ports being located on opposite sides of said pressure port and being spaced equidistantly from said pressure port, a valve member rotatably mounted in said chamber and rotatable in one direction from a neutral position to a first active position and in the opposite direction from said neutral position to a second active position, and means formed in said member and located to establish communication (a) between said pressure port and said first outlet port and also between said drain port and said second outlet port when said valve member is rotated in said one direction from said neutral position and through a predetermined angle of less than 45 degrees to said first active position, and (b) between said pressure port and said second outlet port and also between said drain port and said first outlet port when said valve member is rotated in the opposite direction from said neutral position and through the same predetermined angle to said second active position, said means comprising first and second openings formed in said valve member and adapted to communicate with said pressure port and with said first outlet port, respectively, when said valve member is in its first active position, a first passage formed in said valve member and establishing communication between said first and second openings, a third opening formed in said valve member and adapted to communicate with said second outlet port when said valve member is in its first active position, a second passage formed in said valve member and establishing communication between said third opening and said chamber, fourth and fifth openings formed in said valve member and adapted to communicate with said pressure port and with said second outlet port, respectively, when said valve member is in its second active position, a third passage formed in said valve member and establishing communication between said fourth and fifth openings, a sixth opening formed in said valve member and adapted to communicate with said first outlet port when said valve member is in its second active position, a fourth passage formed in said valve member and establishing communication between said sixth opening and said chamber, said first, second, fourth and fifth openings being spaced from one another around a circle with the angular spacing between said first and fourth openings being different from the angular spacing between said second and fifth openings and with the angular spacing between said first and second openings being equal to the angular spacing between said fourth and fifth openings.

2. A rotary valve as defined in claim 1 further including an actuator pivotally mounted by said housing to turn in opposite directions from a neutral position, and means connecting said actuator to said valve member and operable to turn said member through said predetermined angle from its neutral position to its first active position or through the same predetermined angle from its neutral position to its second active position when said actuator is pivoted respectively in one direction or the other from its neutral position and through an angle which is less than said predetermined angle.

3. A rotary valve as defined in claim 2 in which said valve member is mounted in said housing to rotate about a first axis and in which said actuator comprises an element mounted by said housing to turn about a second axis extending parallel to but offset radially from said first axis, said connecting means comprising a lever having one end portion connected to said valve member to turn the member about said first axis and having an opposite end portion connected to said element at a location offset radially from said first and second axes and connected to be turned by said element.

4. A rotary valve as defined in claim 3 further including means on said element for turning said lever about said first axis while permitting said element to turn about said second axis.

5. A rotary valve as defined in claim 4 in which said one end portion of said lever is connected rigidly to said valve member and in which said opposite end portion of said lever is connected slidably to said element.

6. A rotary valve as defined in claim 5 further including resilient means biasing said element toward its neutral position.

7. A rotary valve as defined in claim 1 in which the angular spacing between said first and fourth openings is a whole multiple of said predetermined angle and in which the angular spacing between said second and fifth openings is a different whole multiple of said predetermined angle.

8. A rotary valve as defined in claim 1 in which said predetermined angle is approximately 30 degrees.

* * * * *